United States Patent
Chung

(10) Patent No.: US 9,661,912 B1
(45) Date of Patent: May 30, 2017

(54) CARRYING DEVICE FOR BELONGINGS

(71) Applicants: HSING LI LUNG ENTERPRISE CO., LTD., Xiushui Township, Changhua County (TW); Wen-Liang Chung, Changua County (TW)

(72) Inventor: Wen-Liang Chung, Ducan Township, Changhua County (TW)

(73) Assignees: Hsing Li Lung Enterprise Co., Ltd., Xiushui Township (TW); Wen-Liang Chung, Changua County (TW)

( * ) Notice: Subject to any disclaimer, the term of this patent is extended or adjusted under 35 U.S.C. 154(b) by 0 days.

(21) Appl. No.: 15/155,047

(22) Filed: May 15, 2016

(51) Int. Cl.
*A45F 5/00* (2006.01)
*F16B 2/10* (2006.01)
*B60R 11/00* (2006.01)

(52) U.S. Cl.
CPC .......... *A45F 5/00* (2013.01); *A45F 2005/008* (2013.01); *B60R 2011/0059* (2013.01); *F16B 2/10* (2013.01); *Y10T 24/4453* (2015.01); *Y10T 24/44291* (2015.01)

(58) Field of Classification Search
CPC ...... B60R 2011/0059; B60R 2011/0071; B62J 11/00; B62J 11/02; F16M 13/02; A45F 2005/008; A45F 2200/0516; Y10T 24/44291; Y10T 24/4453; Y10T 24/44538; F16B 2/10
USPC ....... 224/219, 220, 221, 222, 267, 558, 570, 224/461, 448; 248/313, 316.5
See application file for complete search history.

(56) References Cited

U.S. PATENT DOCUMENTS

| | | | | |
|---|---|---|---|---|
| 2,449,324 | A * | 9/1948 | Robinson | A45C 1/04 224/219 |
| 3,546,750 | A * | 12/1970 | Sheehan | B65D 63/1027 24/16 R |
| 6,029,938 | A * | 2/2000 | Fava | A45F 5/00 108/43 |
| 6,206,258 | B1 * | 3/2001 | Calder | B62J 11/00 224/251 |
| 7,147,191 | B2 * | 12/2006 | Ichikawa | F16M 13/02 16/340 |
| 8,262,070 | B2 * | 9/2012 | Liu | B60R 11/0241 269/254 R |
| 8,622,469 | B2 * | 1/2014 | Hogg | B60R 11/00 248/313 |

(Continued)

FOREIGN PATENT DOCUMENTS

ZA          EP 0510981 A1 * 10/1992 ............... A41F 1/00

*Primary Examiner* — Justin Larson
(74) *Attorney, Agent, or Firm* — Alan D. Kamrath; Kamrath IP Lawfirm, P.A.

(57) ABSTRACT

A carrying device for belongings contains: a body and at least one clamper. The body includes a connection portion, the connection portion has at least one curved arm arranged on at least one side thereof respectively, each curved arm has a first rotatable coupling part, and the first rotatable coupling part has at least one first ratchet tooth. Each clamper includes a second rotatable coupling part arranged on one end thereof and rotatably coupled with the first rotatable coupling part, wherein among the at least one clamper and the body forms an adjustable clamping space, the second rotatable coupling part has a flexible column, and the flexible column has a plurality of second ratchet teeth which engage with the at least one first ratchet tooth of the first rotatable coupling part of said each curved arm.

10 Claims, 10 Drawing Sheets

(56) References Cited

U.S. PATENT DOCUMENTS

| | | | |
|---|---|---|---|
| 8,631,544 B1* | 1/2014 | Shotey | F16B 45/025 24/132 R |
| 2002/0151930 A1* | 10/2002 | Mills | A61H 39/04 606/204 |
| 2009/0044821 A1* | 2/2009 | Hatala | A45D 24/36 132/200 |
| 2010/0006720 A1* | 1/2010 | Chien-Ping | B62J 9/006 248/201 |
| 2010/0301079 A1* | 12/2010 | John | A45F 5/00 224/269 |

* cited by examiner

CARRYING DEVICE FOR BELONGINGS

BACKGROUND OF THE INVENTION

Field of the Invention

The present invention relates to a carrying device, and more particularly to the carrying device which is used to carry belongings.

Description of the Prior Art

With technology development, people carry electronic belongings (such as smartphone, PDA, navigation device, or media player) with them in daily life, but it is inconvenient to take the electronic belongings out of a backpack or hold the electronic belongings on hand often. Therefore, it is necessary to develop a carrying device configured to accommodate the electronic belongings in which a solar panel is built, thus avoiding interference of electromagnetic waves from the electronic belongings.

The carrying device contains carrying bag, arm bag, hand bag, waist bag, or a specific bag fixed on user's wrist by using a flexible strap, wherein a torsion spring is mounted on a coupling shaft of the carrying device so that when the flexible strap connects with a fastener, the torsion spring pushes the flexible strap to secure on an object, thus tying the carrying device on the object fixedly.

However, the carrying device has defects as follows:

1. The flexible strap has to be pulled outwardly over the torsion spring so as to drive the coupling shaft to revolve and to extend the flexible strap, and when the flexible strap is extended sufficiently and passes through the object, a retainer is inserted through an opening so as to retain with a hook of the fastener, hence the flexible strap is fixed on the fastener. Nevertheless, such an operation is troublesome and the flexible strap is harmful for user after a period of using time.

2. The carrying device has many related components (inclusive of the torsion spring and a spring) which are assembled difficultly, thus increasing production cost and failure rate.

3. A button is configured to turn on the carrying device, but the carrying device is opened as touching the button unexpectedly.

The present invention has arisen to mitigate and/or obviate the afore-described disadvantages.

SUMMARY OF THE INVENTION

The primary objective of the present invention is to provide a carrying device for belongings in which at least one clamper is rotated so that a clamping space forms between the at least one clamper and a body, such that the clamping space clamps user's wrist or a post easily and stably by way of at least one first ratchet tooth and a plurality of second ratchet teeth.

Further objective of the present invention is to provide a carrying device for belongings which reduces a number of related components and is assembled easily, for example, a torsion spring and a spring are eliminated, thus lowering production cost and failure rate.

Another objective of the present invention is to provide a carrying device for belongings which is turned on based on using requirements by way of a flexible column so that the plurality of second ratchet teeth of the flexible column remove from the at least one first ratchet tooth of a curved arm of the body.

To obtain above objectives, a carrying device for belongings provided by a preferred embodiment of the present invention contains: a body and at least one clamper.

The body includes a connection portion, and the connection portion has at least one curved arm arranged on at least one side thereof respectively, each of the at least one curved arm has a first rotatable coupling part, and the first rotatable coupling part has at least one first ratchet tooth.

Each clamper includes a second rotatable coupling part arranged on one end thereof and rotatably coupled with the first rotatable coupling part, wherein among the at least one clamper and the body forms an adjustable clamping space, the second rotatable coupling part has a flexible column, and the flexible column has a plurality of second ratchet teeth which engage with the at least one first ratchet tooth of the first rotatable coupling part of said each curved arm of the body, hence the at least one clamper engages and faces the clamping space, and the flexible column is pulled outwardly so as to deform, the plurality of second ratchet teeth of the flexible column remove from the at least one first ratchet tooth of the body so as to pull said each clamper outwardly and to increase the clamping space.

DETAILED DESCRIPTION OF THE PREFERRED EMBODIMENTS

Figure 1:
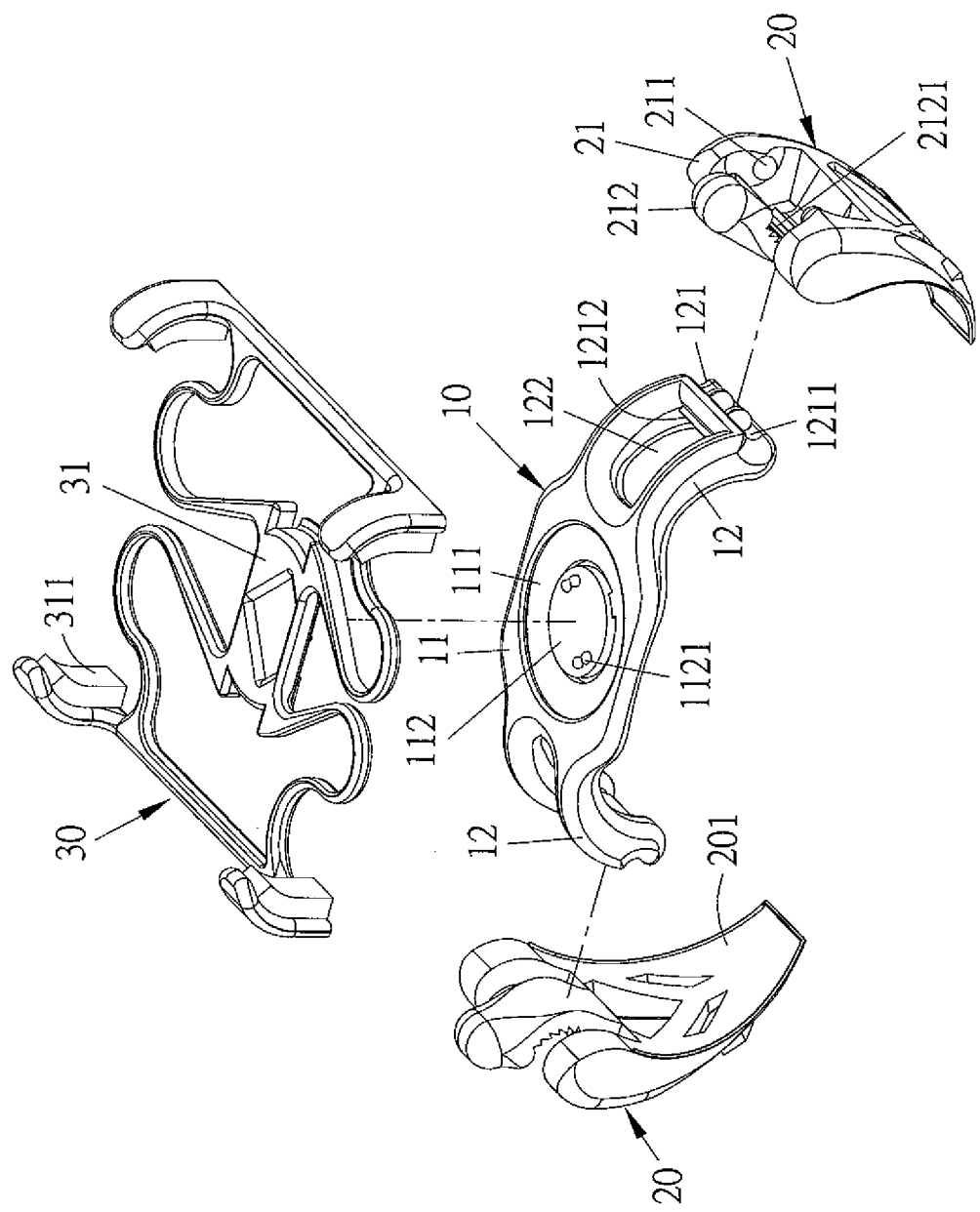
FIG. 1 is a perspective view showing the exploded components of a carrying device for belongings in accordance with a preferred embodiment of the present invention.
Figure 2:
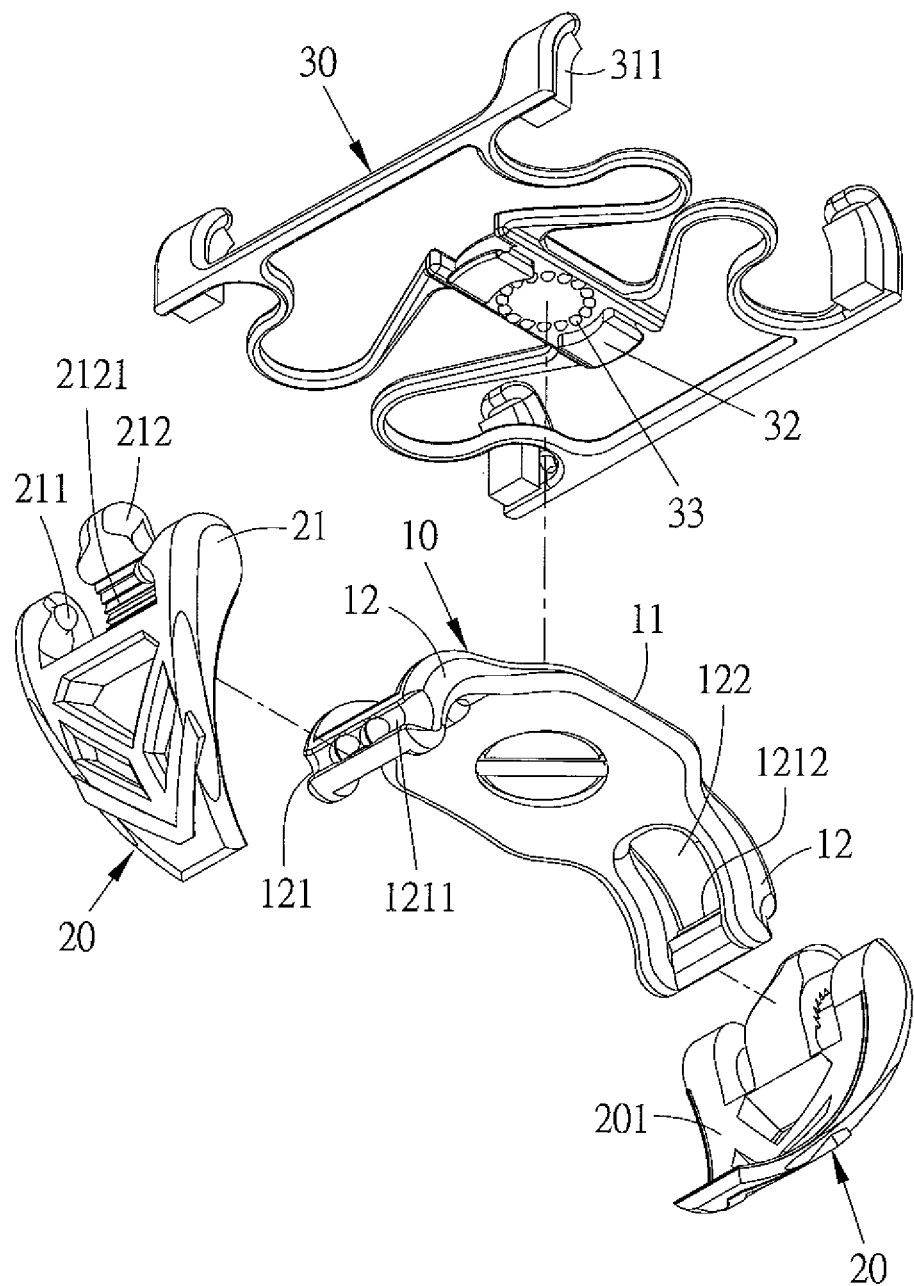
FIG. 2 is another perspective view showing the exploded components of the carrying device for the belongings in accordance with the preferred embodiment of the present invention.
Figure 3:
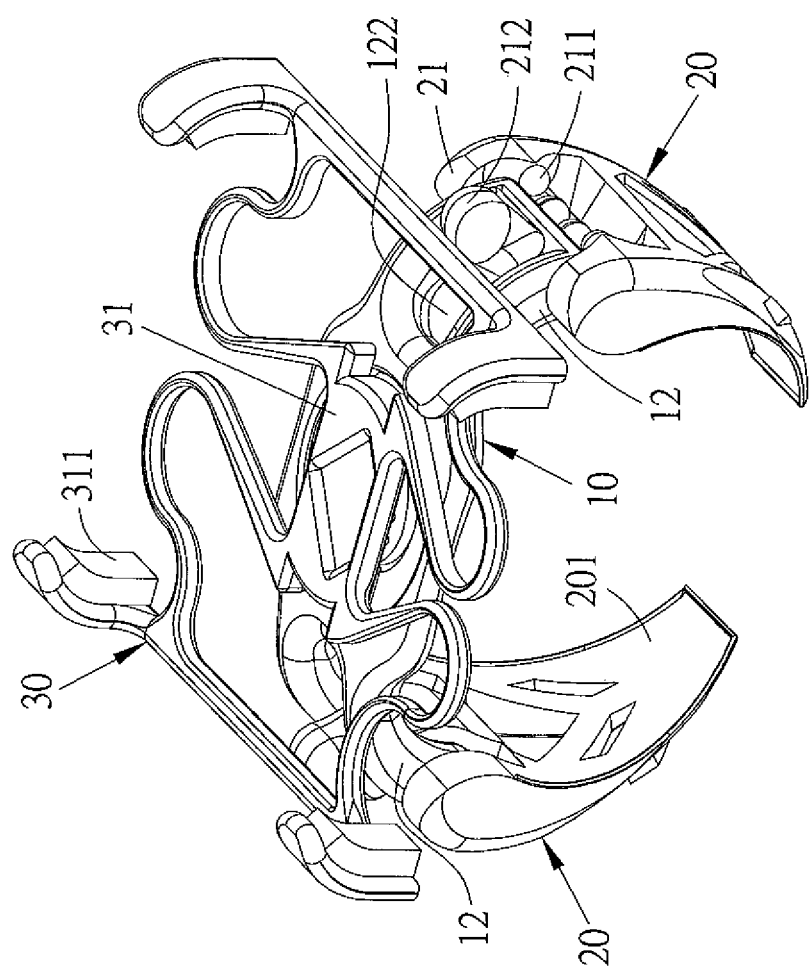
FIG. 3 is a perspective view showing the assembly of the carrying device for the belongings in accordance with the preferred embodiment of the present invention.
Figure 4:
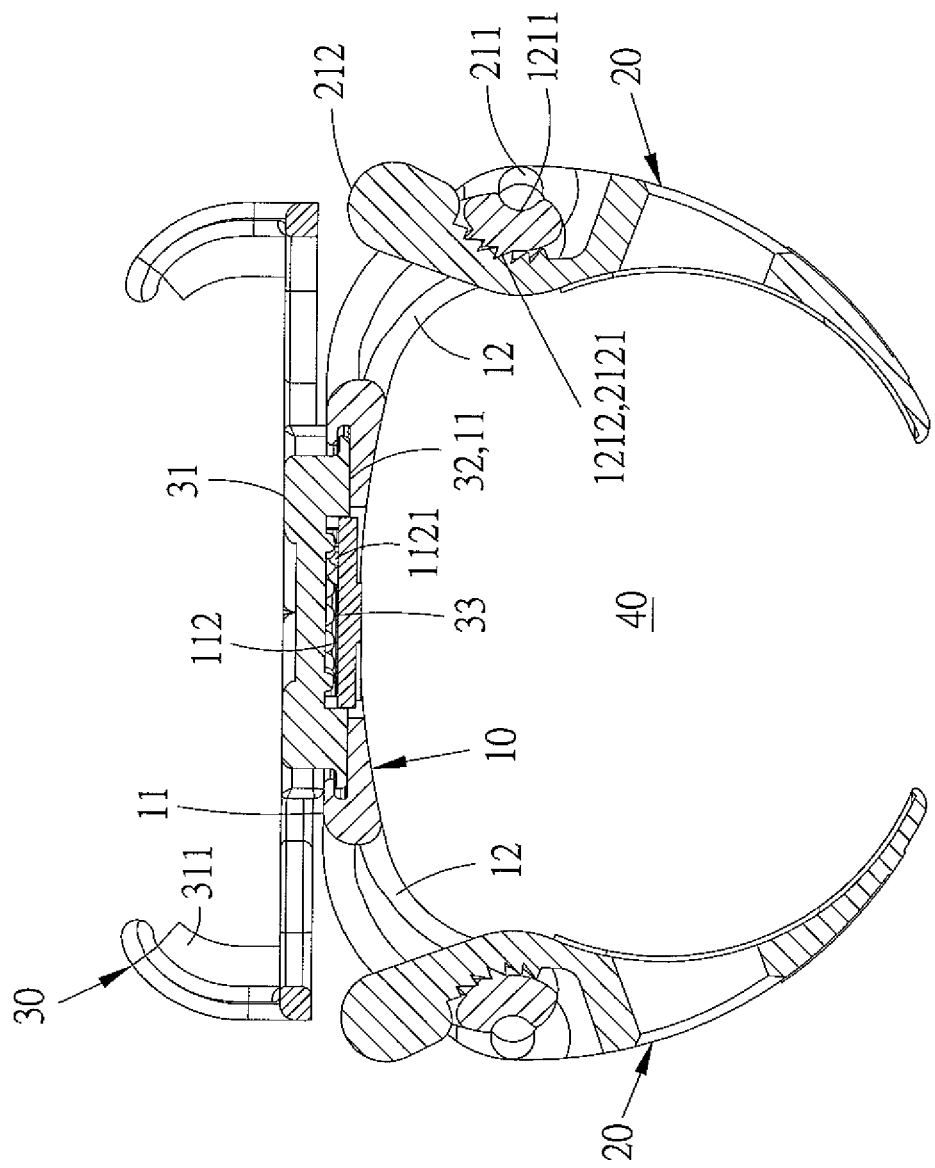
FIG. 4 is a cross sectional view showing the assembly of the carrying device for the belongings in accordance with the preferred embodiment of the present invention.
Figure 5:
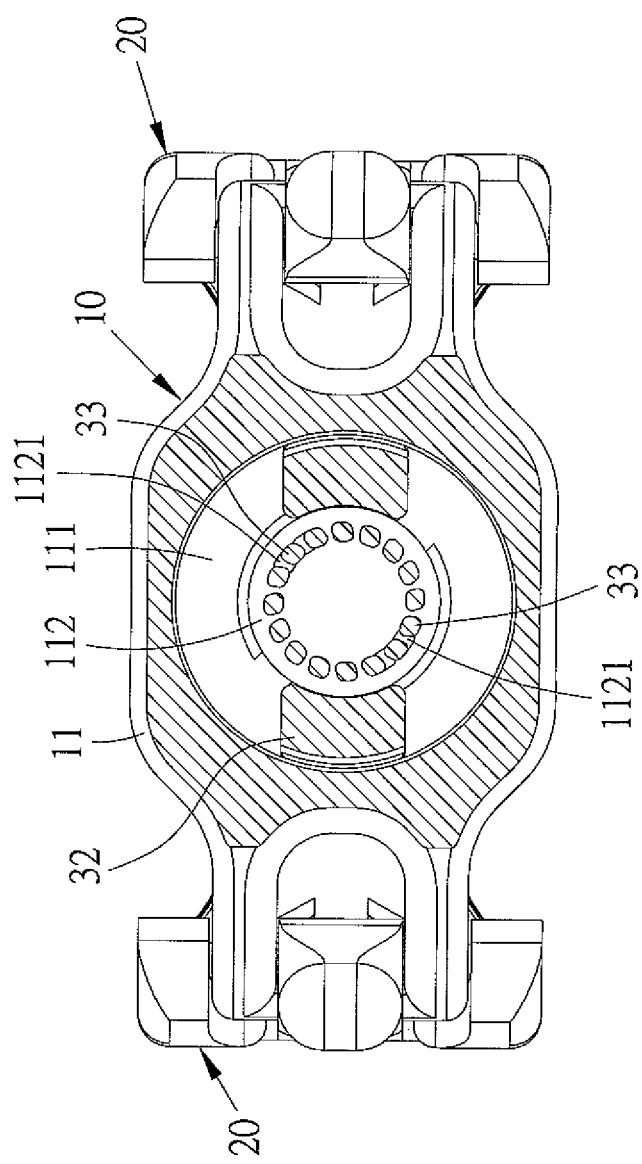
FIG. 5 is another cross sectional view showing the assembly of the carrying device for the belongings in accordance with the preferred embodiment of the present invention.

The present invention will be clearer from the following description when viewed together with the accompanying drawings, which show, for purpose of illustrations only, the preferred embodiment in accordance with the present invention.

With reference to FIGS. 1 to 5, a carrying device for belongings according to a preferred embodiment of the present invention comprises: a body 10, two clampers 20, and a connector 30.

The body 10 includes a connection portion 11 configured to accommodate belongings, the connection portion 11 has at least one curved arm 12 arranged on at least one side thereof respectively. In this embodiment, the connection portion 11 has a curved arm 12 arranged on each of two sides thereof, and the connection portion 11 also has a receiving groove 111 defined thereon so as to accommodate a flexible cap 112 on which at least one first boss 1121 are formed, the curved arm 12 on said each side of the connection portion 11 has a first rotatable coupling part 121 in a rod shape, and the curved arm 12 has an orifice 122 defined between the first rotatable coupling part 121 and the connection portion 11, wherein the first rotatable coupling part 121 has a slot 1211 and a plurality of first ratchet teeth 1212.

At least one clamper 20. In this embodiment, each of the two clampers 20 is arcuate and includes a second rotatable coupling part 21 arranged on one end thereof, and the second rotatable coupling part 21 has a peg 211 and a flexible column 212 inserted into the orifice 122 of the curved arm 12 of the body 10, the flexible column 212 has a plurality of second ratchet teeth 2121, and the peg 211 is mounted in the slot 1211 of the first rotatable coupling part 121 of the curved arm 12, such that said each clamper 20 is in connection with the curved arm 12 of the body 10, and among the two clampers 20 and the body 10 forms an adjustable clamping space 40, wherein the plurality of second ratchet teeth 2121 engage with the plurality of first ratchet teeth 1212 of the first rotatable coupling part 121 so that the two clampers 20 engage and clamp the clamping space 40. Furthermore, said each clamper 20 includes a first protective sheet 201 fixed thereon adjacent to the clamping space 40 and made of foam material.

The connector 30 is secured on the connection portion 11 of the body 10 and includes an accommodation portion 31 for accommodating the belongings, and the accommodation portion 31 has a second protection pad 311 disposed thereon so as to protect the belongings and to balance pressures, the connector 30 also includes at least one retainer 32 and multiple second bosses 33 surrounding around a central portion of a bottom thereof. In this embodiment, two retainers 32 are fitted and retained with the receiving groove 111 of the connection portion 11 of the body 10, wherein the multiple second bosses 33 engage with the at least one first boss 1121 on the flexible cap 112 of the body 10 so that the connector 30 is rotated to a desired angle and positions automatically after rotation.

Figure 6:
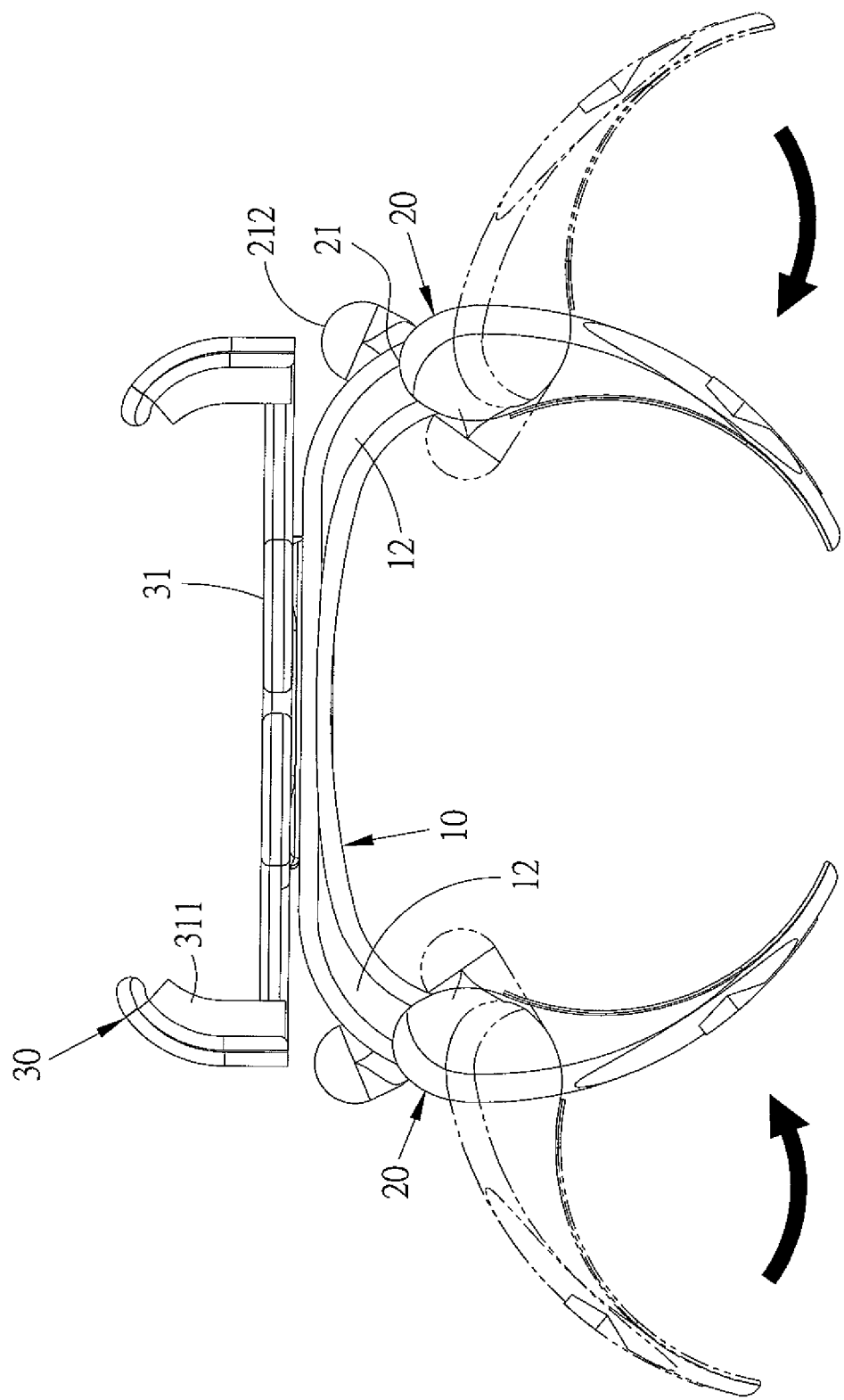
FIG. 6 is a side plan view showing the operation of two clampers of the carrying device for the belongings in accordance with the preferred embodiment of the present invention.
Figure 7:
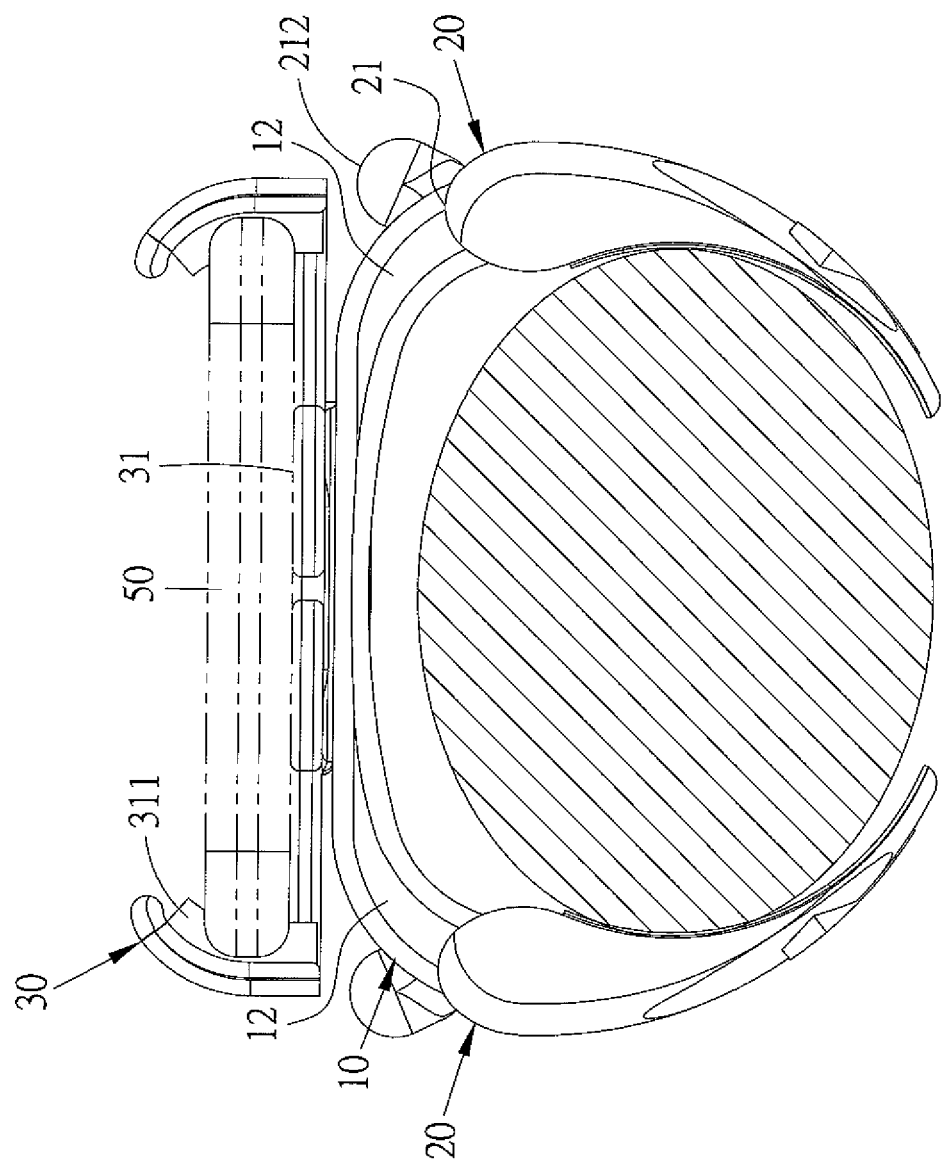
FIG. 7 is a cross sectional view showing the application of the carrying device for the belongings in accordance with the preferred embodiment of the present invention.

In operation, as shown in FIGS. 6 and 7, the two clampers 20 are rotated relative to each other so as to diminish the clamping space 40 among the two clampers 20 and the body 10, hence the clamping space 40 clamps user's wrist or a post, and the plurality of second ratchet teeth 2121 of said each clamper 20 engage with the plurality of first ratchet teeth 1212 of the curved arm 12 of the body 10 so as to limit said each clamper 20 securely and to fix the belongings 50 (such as smartphone, PDA, navigation device, or media player) on the body 10 by mating with the connector 30. Alternatively, the smartphone, the PDA, the navigation device, or the media player is connected with the body 10 so as to be portable.

Figure 8:
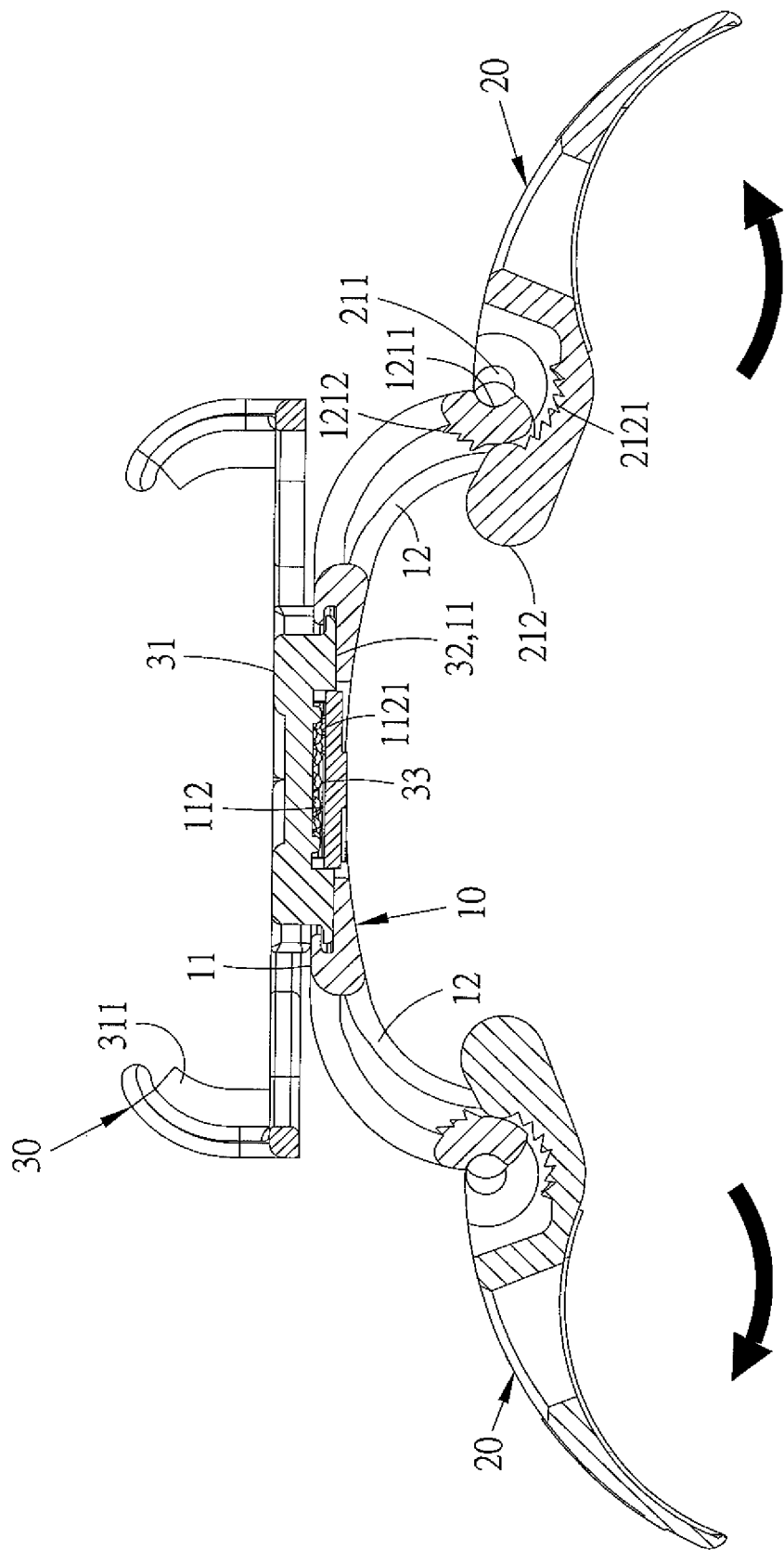
FIG. 8 is a cross sectional view showing the operation of the two clampers of the carrying device for the belongings in accordance with the preferred embodiment of the present invention.

As desiring to remove the belongings 50 from the body 10, as illustrated in FIG. 8, the flexible column 212 of the second rotatable coupling part 21 of said each clamper 20 is pulled outwardly so as to deform, and the plurality of second ratchet teeth 2121 of the flexible column 212 remove from the plurality of first ratchet teeth 1212 of the curved arm 12 so as to pull said each clamper 20 outwardly and to increase the clamping space 40, thus removing the carrying device from the user's wrist or the post.

Figure 9:
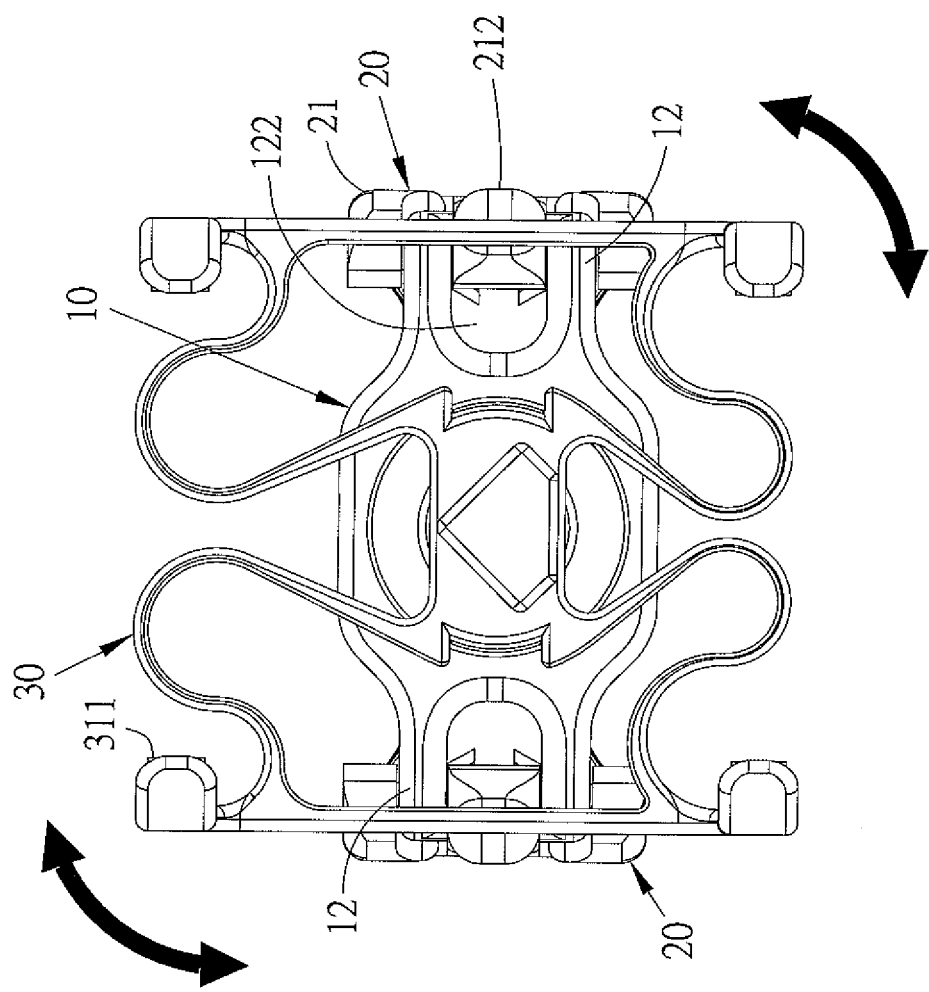
FIG. 9 is a side plan view showing the operation of a connector of the carrying device for the belongings in accordance with the preferred embodiment of the present invention.

Referring to FIG. 9, the connector 30 is rotated to the desired angle by using the flexible cap 112 so that the multiple second bosses 33 of the connector 30 remove from the at least one first boss 1121 on the flexible cap 112 of the body 10, and after the connector 30 is rotated to the desired angle, the multiple second bosses 33 of the connector 30 engage with the at least one first boss 1121 on the flexible cap 112 of the body 10, thus positioning the connector 30.

Figure 10:
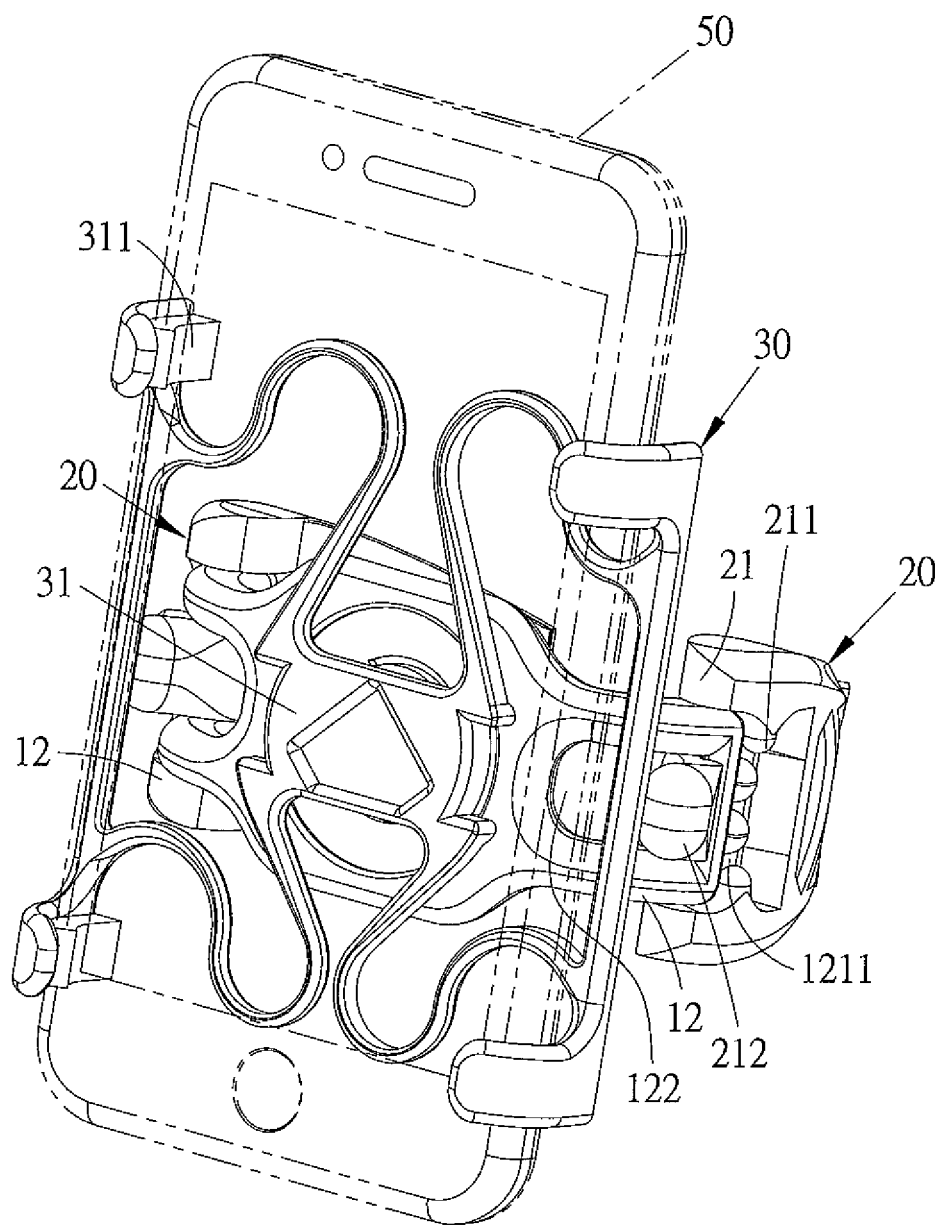
FIG. 10 is a perspective view showing the application of the carrying device for the belongings in accordance with the preferred embodiment of the present invention.

With reference to FIG. 10, the two clampers 20 are erected on a desk so that the connector 30 and the belongings 50 tilt, and the user applies the belongings 50 conveniently.

In another embodiment, the first rotatable coupling part 121 has at least one first ratchet tooth 1212, and the flexible column 212 has a plurality of second ratchet teeth 2121. Alternatively, the first rotatable coupling part 121 has a plurality of first ratchet teeth 1212, and the flexible column 212 has at least one second ratchet tooth 2121.

Accordingly, the carry device of the present invention has advantages as follows:

1. The two clampers 20 are rotated so that the clamping space 40 forms among the two clampers 20 and the body 10, such that the clamping space 40 clamps the user's wrist or the post easily and stably by way of the plurality of second ratchet teeth 2121 and the plurality of first ratchet teeth 1212.

2. The carrying device reduces a number of related components and is assembled easily, for example, a torsion spring and a spring are eliminated, thus lowering production cost and failure rate.

3. The carrying device is turned on based on using requirements by way of the flexible column 212 so that the plurality of second ratchet teeth 2121 of the flexible column 212 remove from the plurality of first ratchet teeth 1212 of the curved arm 12 of the body 10, thus avoiding unexpected opening of the carrying device.

4. The body 10 and the two clampers 20 are simplified so as to reduce thickness of the carrying device.

While we have shown and described various embodiments in accordance with the present invention, it is clear to those skilled in the art that further embodiments may be made without departing from the scope of the present invention.

What is claimed is:

1. A carrying device for belongings comprising:
a body including a connection portion, and the connection portion having at least one curved arm arranged on at least one side thereof respectively, each of the at least one curved arm having a first rotatable coupling part, and the first rotatable coupling part having at least one first ratchet tooth;
at least one clamper, and each clamper including a second rotatable coupling part arranged on one end thereof and rotatably coupled with the first rotatable coupling part, wherein among the at least one clamper and the body forms an adjustable clamping space, the second rotatable coupling part has a flexible column, and the flexible column has a plurality of second ratchet teeth which engage with the at least one first ratchet tooth of the first rotatable coupling part of said each curved arm of the body, hence the at least one clamper engages and faces the clamping space, and the flexible column is pulled outwardly so as to deform, the plurality of second ratchet teeth of the flexible column remove from the at least one first ratchet tooth of the body so as to pull said each clamper outwardly and to increase the clamping space.

2. The carrying device for the belongings as claimed in claim 1, wherein the connection portion of the body has two curved arms arranged on two sides thereof respectively, and said each clamper is in connection with the curved arm.

3. The carrying device for the belongings as claimed in claim 1, wherein the first rotatable coupling part of the body has a slot, and the second rotatable coupling part of said each clamper has a peg mounted in the slot of the first rotatable coupling part of the body so as to rotatably connect said each clamper with the curved arm of the body.

4. The carrying device for the belongings as claimed in claim 1, wherein the curved arm of the body has an orifice defined between the first rotatable coupling part and the connection portion so as to accommodate the flexible column of said each clamper.

5. The carrying device for the belongings as claimed in claim 1 further comprising a connector secured on the connection portion of the body.

6. The carrying device for the belongings as claimed in claim 5, wherein the connection portion of the body also has a receiving groove defined thereon so as to accommodate a flexible cap on which at least one first boss are formed, the connector includes an accommodation portion for accommodating belongings, and the connector also includes at least one retainer and multiple second bosses surrounding around a central portion of a bottom thereof, wherein the at least one retainer is fitted and retained with the receiving groove of the connection portion of the body, wherein the multiple second bosses engage with the at least one first boss on the flexible cap of the body, hence the connector is rotated to a desired angle and positions automatically after rotation.

7. The carrying device for the belongings as claimed in claim 6, wherein the accommodation portion has a second protection pad disposed thereon.

8. A carrying device for belongings comprising:
a body including a connection portion, and the connection portion having at least one curved arm arranged on at least one side thereof respectively, each of the at least one curved arm having a first rotatable coupling part, and the first rotatable coupling part having multiple first ratchet teeth;
at least one clamper, and each clamper including a second rotatable coupling part arranged on one end thereof and rotatably coupled with the first rotatable coupling part, wherein among the at least one clamper and the body forms an adjustable clamping space, the second rotatable coupling part has a flexible column, and the flexible column has at least one second ratchet tooth which engages with the multiple first ratchet teeth of the first rotatable coupling part of said each curved arm of the body, hence the at least one clamper engages and faces the clamping space, and the flexible column is pulled outwardly so as to deform, the at least one second ratchet tooth of the flexible column removes from the multiple first ratchet teeth of the body so as to pull said each clamper outwardly and to increase the clamping space.

9. The carrying device for the belongings as claimed in claim 8, wherein the connection portion of the body has two curved arms arranged on two sides thereof respectively, and said each clamper is in connection with the curved arm.

10. The carrying device for the belongings as claimed in claim 8 further comprising a connector secured on the connection portion of the body; wherein the connection portion of the body also has a receiving groove defined thereon so as to accommodate a flexible cap on which at least one first boss are formed, the connector includes an accommodation portion for accommodating belongings, and the connector also includes at least one retainer and multiple second bosses surrounding around a central portion of a bottom thereof, wherein the at least one retainer is fitted and retained with the receiving groove of the connection portion of the body, wherein the multiple second bosses engage with the at least one first boss on the flexible cap of the body, hence the connector is rotated to a desired angle and positions automatically after rotation.

\* \* \* \* \*